Patented Oct. 15, 1940

2,217,676

UNITED STATES PATENT OFFICE 2,217,676

TREATMENT OF WELLS

William A. Fry, Midland, Mich., assignor to The Dow Chemical Company, Midland, Mich., a corporation of Michigan No Drawing. Application May 27, 1937, Serial No. 145,036

5 Claims. (Cl. 166—21)

This invention relates to the treatment of wells with a reagent to increase the permeability of the formation to the flow of fluids. It more particularly concerns the treatment of a well drilled into a calcareous producing formation to increase the production of fluid therefrom.

A well known method of increasing the permeability of calcareous formations to facilitate the flow of oil or gas, for example, to a well drilled thereinto consists in injecting a charge of hydrochloric acid into the formation, allowing it to react therein to dissolve portions thereof, whereby flow channels are formed and existing channels enlarged. The spent acid is then withdrawn when the well is put on production. In applying this method I have found that the desired increased rate of production is not always obtained. This may be due to a number of causes some of which are beyond control. In many cases, however, I have found that the response of the well to the treatment depends upon the manner in which the acid acts upon the formation and this is susceptible of control. In the usual case, where the formation is quite soluble in the acid, such as when the formation is composed largely of limestone or dolomite, the acid acts relatively rapidly upon that part of the formation immediately surrounding the well bore. As a consequence only the pores or channels in the immediate vicinity of the well bore become enlarged, those lying beyond being substantially unaffected by the acid. This is evidenced by the fact that the acid becomes neutralized quite rapidly by the calcareous material of the formation while the acid is being injected thereinto and, when the action has ceased and the acid is withdrawn, it is found to be substantially fully spent without bringing about as large an increase in production as would be expected by the calculated increase in permeability of the formation corresponding to the amount which is dissolved by the acid.

The principal object of my invention is to provide an improved method of acid-treating a calcareous oil-producing formation, whereby the action of the acid is controlled to reduce its action in the immediate vicinity of the well bore and thereby extend the effect of the acid to more remote portions of the producing horizon. Other objects and advantages will appear as the description of the invention proceeds.

I have discovered that by including in the hydrochloric acid solution which is injected into the formation, a relatively small proportion of an agent soluble in the acid which forms a substantially insoluble reaction product with soluble calcium salts, the acid can be forced greater distances into the formation before it becomes neutralized or spent. As a result much longer drainage channels are produced, reaching the more remote portions of the producing horizon, so that a greater increase in production is obtained from the same amount of acid used in the treatment.

The invention then consists of the method hereinafter fully described and particularly pointed out in the claims, the following description setting forth in detail certain modes of carrying out the invention such modes illustrating, however, but various ways in which the principle of the invention may be used.

The treatment contemplated by my process comprises introducing into a calcareous formation surrounding a well an aqueous hydrochloric acid solution in the presence of relatively small proportion of an agent soluble therein which forms a substantially insoluble compound upon reacting with soluble calcium salts, e. g., calcium chloride, and which has the effect of retarding the rate of action of the acid upon calcareous materials. Such an agent does not prevent the acid from dissolving the calcareous matter, but does have the effect of retarding the speed of attack by the acid. Such agents are known generally as calcium precipitating agents because their aqueous solutions react with aqueous solutions of soluble calcium salts, e. g., calcium chloride, precipitating the calcium therein as a substantially insoluble compound. Examples of agents of the type in question are the acid-soluble sulphates, phosphates, oxalates, and borates. An aqueous solution of sodium sulphate, for example, when added to an aqueous solution of calcium chloride produces a precipitate of calcium sulphate as the reaction product, and such a product can be formed similarly if the aqueous solution also contains hydrochloric acid. A relatively small proportion of such agent in the presence of hydrochloric acid, when it acts upon calcareous matter, forms a substantially insoluble reaction product upon the calcareous matter, retarding the rate of action of the acid thereon. Specific examples of these agents are the alkali metal sulphates, particularly sodium and potassium sulphate, tri-sodium phosphate, di-sodium phosphate, sodium oxalate, sodium borate, and the like. These may be used in amounts of from about 0.5 to 10 per cent of the weight of the acid solution of suitable concentration, such as from 5 to 25 per cent of HCl by weight. A generally useful concentration of acid is about 15 per cent by weight with which may be used from about 1 to 3 per cent of the specified agents as a preferred proportion. If desired an inhibitor may be included in the acid solution as disclosed in U. S. Patent No. 1,877,504.

As illustrative of the effect of the addition of the agent to the acid on its rate of action on limestone, it was found that in 15 per cent hydrochloric acid a given quantity of limestone was completely dissolved in about five and one-half minutes. The same quantity of the limestone when treated with a 15 per cent solution of hydrochloric acid containing about 1 per cent of di-sodium phosphate, required about nine and one-half minutes to be completely dissolved. Thus, the presence of 1 per cent of di-sodium phosphate in the acid retarded its rate of action upon the limestone more than 42 per cent. A similar retarded rate of action of the acid on limestone was found when sodium sulphate, tri-sodium phosphate, and sodium borate were employed in proportions of from 1 to 10 per cent with hydrochloric acid solutions containing from 5 to 20 per cent of HCl.

In treating a well, according to my invention, it is preferable first to form a solution of the agent in the acid and then inject the acid into the producing formation of the well. If desired, the agent may be first dissolved in a quantity of water and introduced into the well and thence into the formation just ahead of or with the acid solution. Any method may be employed for injecting the acid into the formation. For example, the method disclosed in U. S. Patent No. 1,891,667 or other methods known to the art may be employed. After the solution is injected into the formation, it is allowed to react and then the well may be put into production as by bailing, pumping, or allowing the well to flow.

Among the advantages of my invention are that in treating a calcareous formation with hydrochloric acid the ineffective expenditure of acid in the immediate vicinity of the well bore is reduced; the acid solution may be forced out into the formation for greater distances before becoming spent, thereby producing flow channels reaching farther out into the productive stratum; flow channels may be created in the outlying portions of the formation to reach sources of oil or other fluid which cannot otherwise readily reach the well.

Although the method has been described with particular reference to its use in oil and gas wells, it is to be understood that other type of wells such as those producing water or brine from a calcareous formation may be similarly treated.

Other modes of applying the principle of my invention may be employed instead of those explained, change being made as regards the method herein disclosed, providing the step or steps stated by any of the following claims or the equivalent of such stated step or steps be employed.

I therefore particularly point out and distinctly claim as my invention:

1. A method of treating a well in a calcareous formation with hydrochloric acid solution which comprises introducing the acid solution into the well and thence into the formation in the presence of a relatively small proportion of a calcium precipitating agent dissolved in the acid solution, the agent being selected from the group of calcium precipitating agents consisting of the sulphates, phosphates, oxalates, and borates of the alkali metals.

2. A method of treating a well in a calcareous formation which comprises introducing into the well and thence into the formation an aqueous solution containing from 5 to 25 per cent of HCl and from about 0.5 to 10 per cent of a calcium precipitating agent soluble in the acid solution, the agent being selected from the group of calcium precipitating agents consisting of the water-soluble sulphates, phosphates, oxalates, and borates.

3. In a method of treating a well in a calcareous formation with hydrochloric acid, the step which consists in adding to the acid a relatively small proportion of an alkali metal sulphate.

4. In a method of treating a well in a calcareous formation with hydrochloric acid, the step which consists in adding to the acid a relatively small proportion of an alkali metal phosphate.

5. In a method of treating a well in a calcareous formation with hydrochloric acid, the step which consists in adding to the acid from 0.5 to 10 per cent by weight of sodium sulphate.

WILLIAM A. FRY.